(12) United States Patent
Griffin et al.

(10) Patent No.: US 7,776,944 B2
(45) Date of Patent: Aug. 17, 2010

(54) COMPOSITE COMPRISING CELLULOSE AND THERMOPLASTIC POLYMER

(75) Inventors: Elizabeth R. Griffin, Newark, DE (US); George Henry Hofmann, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 966 days.

(21) Appl. No.: 11/345,866

(22) Filed: Feb. 2, 2006

(65) Prior Publication Data

US 2006/0173105 A1    Aug. 3, 2006

Related U.S. Application Data

(60) Provisional application No. 60/649,262, filed on Feb. 2, 2005.

(51) Int. Cl.
*B29C 47/00* (2006.01)

(52) U.S. Cl. ...................................................... 524/13

(58) Field of Classification Search ................... 524/13, 524/35
See application file for complete search history.

(56) References Cited

U.S. PATENT DOCUMENTS

| | | | |
|---|---|---|---|
| 3,485,777 A | 12/1969 | Gaylord | |
| 4,360,635 A * | 11/1982 | Alberts et al. | 525/54.45 |
| 4,559,376 A * | 12/1985 | Kubat et al. | 524/13 |
| 4,686,257 A * | 8/1987 | Mitsuno et al. | 524/449 |
| 4,737,532 A * | 4/1988 | Fujita et al. | 524/13 |
| 4,783,493 A * | 11/1988 | Motegi et al. | 524/13 |
| 5,008,306 A * | 4/1991 | Goguelin | 523/220 |
| 5,574,094 A * | 11/1996 | Malucelli et al. | 525/54.3 |
| 5,633,299 A * | 5/1997 | Van Druten et al. | 524/14 |
| 5,746,958 A * | 5/1998 | Gustafsson et al. | 264/115 |
| 5,827,905 A * | 10/1998 | Grigat et al. | 523/124 |
| 6,008,286 A * | 12/1999 | Groves | 524/505 |
| 6,011,091 A | 1/2000 | Zehner | |
| 6,015,611 A * | 1/2000 | Deaner et al. | 428/326 |
| 6,066,680 A | 5/2000 | Cope | |
| 6,071,984 A * | 6/2000 | Grigat et al. | 523/128 |
| 6,103,779 A * | 8/2000 | Guzauskas | 523/115 |
| 6,103,791 A | 8/2000 | Zehner | |
| 6,124,384 A * | 9/2000 | Shiraishi et al. | 524/35 |
| 6,143,811 A * | 11/2000 | Oda et al. | 524/13 |
| 6,207,729 B1 * | 3/2001 | Medoff et al. | 523/129 |
| 6,255,368 B1 * | 7/2001 | English et al. | 524/13 |
| 6,258,876 B1 * | 7/2001 | Medoff et al. | 524/13 |
| 6,274,248 B1 * | 8/2001 | Goto et al. | 428/500 |
| 6,344,509 B1 * | 2/2002 | Mizutani | 524/322 |
| 6,506,835 B1 * | 1/2003 | Hofmann | 525/63 |
| 6,586,503 B1 * | 7/2003 | Grohman | 524/15 |
| 6,586,504 B1 * | 7/2003 | Archuletta et al. | 524/16 |
| 6,656,982 B2 * | 12/2003 | Yasuda et al. | 524/14 |
| 6,682,789 B2 * | 1/2004 | Godavarti et al. | 428/34 |
| 6,903,149 B2 * | 6/2005 | Yasuda et al. | 524/13 |
| 6,942,829 B2 * | 9/2005 | Drabeck et al. | 264/176.1 |
| 6,971,211 B1 * | 12/2005 | Zehner | 52/518 |
| 6,984,676 B1 * | 1/2006 | Brandt | 524/13 |
| 7,030,179 B2 * | 4/2006 | Patterson et al. | 524/13 |
| 7,037,960 B2 * | 5/2006 | Ukai | 524/13 |
| 7,041,716 B2 * | 5/2006 | Ton-That et al. | 524/13 |
| 2002/0005602 A1 * | 1/2002 | Jacobsen | 264/211 |
| 2002/0016388 A1 * | 2/2002 | Kitayama et al. | 524/35 |
| 2003/0030176 A1 * | 2/2003 | Monovoukas et al. | 264/211 |
| 2003/0149156 A1 * | 8/2003 | Okamoto et al. | 524/445 |
| 2003/0176538 A1 * | 9/2003 | Wu et al. | 524/13 |
| 2003/0212203 A1 * | 11/2003 | Hofmann | 525/63 |
| 2003/0229160 A1 | 12/2003 | Williams | |
| 2004/0204519 A1 * | 10/2004 | Fender et al. | 524/35 |
| 2004/0214925 A1 * | 10/2004 | Sigworth | 524/13 |
| 2005/0004308 A1 * | 1/2005 | Lee et al. | 525/100 |
| 2005/0148697 A1 * | 7/2005 | Leberfinger et al. | 524/13 |
| 2005/0154094 A1 * | 7/2005 | Maeda et al. | 524/35 |
| 2005/0154095 A1 * | 7/2005 | Heath et al. | 524/35 |
| 2006/0084729 A1 * | 4/2006 | Clarke et al. | 524/35 |
| 2006/0091578 A1 * | 5/2006 | Bravo et al. | 264/122 |
| 2006/0094802 A1 * | 5/2006 | Gibson et al. | 524/35 |
| 2006/0135676 A1 * | 6/2006 | Greenwood et al. | 524/492 |
| 2007/0066722 A1 * | 3/2007 | O'Neill et al. | 524/35 |

FOREIGN PATENT DOCUMENTS

| | | |
|---|---|---|
| EP | 1 072 645 B1 | 1/2001 |
| WO | WO 99/57196 | 11/1999 |
| WO | WO 01/21367 A1 | 3/2001 |

OTHER PUBLICATIONS

Wade, Bruce, Vinyl Acetal Polymers, 2003, John Wiley and Sons, Inc. http://www.mrw.interscience.wiley.com/emrw/9780471440260/ epst/article/pst473/current/html?hd=All, polyvinyl&hd=All,acetal.*
PCT International Search Report for International application No. PCT/US2006/003897, dated Jan. 25, 2007.

* cited by examiner

*Primary Examiner*—Mark Eashoo
*Assistant Examiner*—Liam J Heincer

(57) ABSTRACT

Disclosed are composite compositions and articles prepared from such composites. The composition comprises or is produced from cellulose material, thermoplastic polymer, and a compatibilizing agent which is the reaction product of polyvinyl butyral, having hydroxyl functionality, and a second polymer which comprises or is produced from polyvinyl butyral and a second polymer wherein the polyvinyl butyral comprises a hydroxyl functionality and the second polymer reacts with at least a portion of the hydroxyl functionality.

17 Claims, No Drawings

COMPOSITE COMPRISING CELLULOSE AND THERMOPLASTIC POLYMER

This application claims priority to U.S. provisional application Ser. No. 60/649,262, filed Feb. 2, 2005, the entire disclosure of which is incorporated herein by reference.

This invention relates to a composition comprising cellulose, a thermoplastic polymer such as polyvinyl chloride, and a compatibilizing agent.

BACKGROUND OF THE INVENTION

With the rising cost of wood and the shortage of mature trees, there is a present need to find good quality substitutes for wood which continues long into the future. Over the past several years a growing market has emerged for the use of polymer-wood composites to replace traditional solid wood products in applications such as decking, windows, fencing, automobile interiors and pallets. These composite materials typically consist of mixtures of thermoplastic materials with wood particles in the form of sawdust. The composite materials may be used in many of the same applications as an all-wood product but offer the advantages of providing flame resistance, as well as enhanced resistance to rot, attack by insects, and deterioration due to the effects of moisture and sunlight. These products can have the same workability as wood, are splinter-free, and are capable of being colored in bulk as opposed to wood, which can only be surface stained or painted.

Recently there has been an increased interest in composites of wood and polyvinyl chloride (PVC), particularly for use in home siding applications. Such composites are highly desirable because they resemble traditional wood siding more than does uncomposited PVC siding. Moreover, compositing with wood raises the sag temperature of PVC and thus permits the use of dark colors in the composite siding. Dark colored, uncomposited PVC, with its lower sag temperatures, absorbs considerable heat in sunlight and exhibits a tendency to sag. See, e.g., U.S. Pat. Nos. 6,011,091; 6,103,791; and 6,066,680; and U.S. Patent Application 2003/0229160.

However, the known composites contain more than about 40 weight % (%) wood, particularly when they are extruded in a form suitable for siding applications, suffer from edge tear and slow, difficult extrusion.

It would be highly desirable, therefore, to have PVC/wood composites that comprise wood and still have physical properties that allow them to be made using typical PVC processes and be used in traditional PVC applications such as home siding.

SUMMARY OF THE INVENTION

This invention includes a composite composition comprising or produced from (a) from about 10% to about 90% of cellulosic material based on the total weight of the composite composition, (b) from about 70% to about 10% of a thermoplastic polymer based on the total weight of the composite composition, and (c) from about 1% to about 20% of a compatibilizing agent.

The invention also includes an article comprising the composite composition of the invention.

The invention also includes a masterbatch composition comprising or produced from about 50 to about 95% of cellulosic material based on the total weight of the masterbatch composition and from about 5 to about 50% of a compatibilizing agent.

The invention also includes a composite composition produced by blending the masterbatch composition described above with a thermoplastic polymer in such quantities that the composite composition comprises from about 10% to about 90% of cellulosic material and from about 70% to about 10% of the thermoplastic polymer based on the total weight of the composite composition.

DETAILED DESCRIPTION OF THE INVENTION

Trademarks are shown in upper case. The entire disclosures of all references referred to herein are incorporated herein by reference. Unless stated otherwise, all percentages, parts, ratios, etc., are by weight. Further, when an amount, concentration, or other value or parameter is given as either a range or a list of upper values and lower values, this is to be understood as specifically disclosing all ranges formed from any pair of any upper range limit or preferred value and any lower range limit or preferred value, regardless of whether ranges are separately disclosed. It is not intended that the scope of the invention be limited to the specific values recited when defining a range.

One or more cellulosic materials can be used. A wide variety of cellulosic materials can be employed such as those obtained from wood and wood products, such as wood pulp fibers; non-woody paper-making fibers from cotton; straws and grasses, such as rice and esparto; canes and reeds, such as bagasse; bamboos; stalks with bast fibers, such as jute, flax, kenaf, cannabis, linen and ramie; and leaf fibers, such as abaca and sisal; paper or polymer-coated paper including recycled paper and polymer-coated paper. Preferably the cellulosic material used is from a wood source. Suitable wood sources include softwood sources such as pines, spruces, and firs, and hardwood sources such as oaks, maples, eucalyptuses, poplars, beeches, and aspens. The form of the cellulosic materials from wood sources can be sawdust, wood chips, wood flour, or the like.

In addition to sawdust, agricultural residues and/or waste can be used. Agricultural residues are the remainder of a crop after the crop has been harvested. Examples of such suitable residues include residues from the harvesting of wheat, rice, and corn, for example. Examples of agricultural waste suitable for use herein include straw; corn stalks; rice hulls; wheat; oat; barley and oat chaff; coconut shells; peanut shells; walnut shells; jute; hemp; bagasse; bamboo; flax; and kenaff; and combinations thereof.

The cellulosic materials may be screened through various screens, e.g., a 30-mesh or a 40-mesh screen, to obtain a mixture of different size material. The size of the cellulose material used in the composition of the present invention can range from about 10 to about 100 mesh or about 40 to about 100 mesh.

The wood flours include soft and hard woods and combinations thereof. Preferable wood flours are oak and pine, available as OAK 4037 (40 mesh) and PINE 402050 (40 mesh), respectively from American Wood Fibers of Schofield, Wis. Maple wood flour can also be used.

One or more thermoplastic polymers can be used including, for example, polyolefins such as high density polyethylene (HDPE); low density polyethylene (LDPE); linear low density polyethylene (LLDPE); ultrahigh molecular weight polyethylene (UHMWPE); ultra low density polyethylene (ULDPE); copolymers of ethylene and a second α-olefin monomer obtained using a metallocene catalyst (metallocene polyethylenes, or MPE); ethylene/propylene copolymers; terpolymers such as ethylene/propylene/diene monomer (EPDM); and polypropylene homo- and copolymers. Suitable polymers may also include polar polymers and copolymers such as polyvinyl chloride; polyvinyl chloride vinyl acetate copolymers, polyvinyl chloride n-butyl acrylate copolymers, chlorinated polyvinyl chloride; and polystyrene.

The thermoplastic polymer can also comprise at least one polymer including polyethylene, ethylene/α-olefin copolymers, ethylene/propylene/diene monomer terpolymers, polypropylene homopolymers, polypropylene copolymers, polyvinyl chloride, polyvinyl chloride copolymers, chlorinated polyvinyl chloride and polystyrene.

The thermoplastic polymer can also comprise at least one polymer or copolymer including polymers and copolymers of methyl methacrylate or ethylene or both. An ethylene copolymer is a copolymer comprising repeat units derived from ethylene and at least one polar monomer. The repeat units derived from the polar monomer can be present in the range of about 5 to about 50%, or about 10 to about 19%, or 12 to 15%, of the copolymer weight. A polar monomer can include acrylic acid, alkyl acrylic acid, vinyl acetate, alkyl acrylate, or combinations of two or more thereof, based on the total weight of the ethylene copolymer. The alkyl group may contain up to about 20 carbon atoms such as methyl, ethyl, butyl, isobutyl, pentyl, hexyl, and combinations of two or more thereof.

Examples of such polar monomers include acrylic acid, methacrylic acid, ethacrylic acid, methyl acrylate, ethyl acrylate, methyl methacrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, 2-hydroxyethyl methacrylate, vinyl acetic acid, vinyl acetate, vinyl propionate, and combinations of two or more thereof.

An ethylene copolymer may comprise up to 35 wt % of an optional comonomer such as carbon monoxide, sulfur dioxide, acrylonitrile; maleic anhydride, dimethyl maleate, diethyl maleate, dibutyl maleate, dimethyl fumarate, diethyl fumarate, dibutyl fumarate, dimenthyl fumarate, maleic acid, maleic acid monoesters, itaconic acid, fumaric acid, fumaric acid monoester, a salt of these acids, glycidyl acrylate, glycidyl methacrylate, and glycidyl vinyl ether, and combinations of two or more thereof.

The acid moiety of an ethylene copolymer may be neutralized with a cation to produce an ionomer. The neutralization, for example, can range from about 0.1 to about 100, or about 10 to about 90, or about 20 to about 80, or about 20 to about 40 percent, based on the total carboxylic acid content, with a metallic ion. The metallic ions can be monovalent, divalent, trivalent, multivalent, or combinations of two or more thereof. Examples include Li, Na, K, Ag, Hg, Cu, Be, Mg, Ca, Sr, Ba, Cd, Sn, Pb, Fe, Co, Zn, Ni, Al, Sc, Hf, Ti, Zr, Ce, and combinations of two or more thereof. If the metallic ion is multivalent, a complexing agent, such as stearate, oleate, salicylate, and phenolate radicals can be included, as disclosed in U.S. Pat. No. 3,404,134. Frequently used include Na, Zn, or combinations thereof.

The ionomer can also be a blend of an ionomer having a greater than 20% neutralization and, for example, an ethylene (alkyl)acrylic acid copolymer to achieve the desired degree of neutralization.

For example, an ethylene alkyl acrylate copolymer can comprise from 1 to 30 weight % of at least one E/X/Y copolymer wherein E comprises ethylene; X is a monomer selected from the group consisting of vinyl acetate and alkyl acrylic esters; and Y is one or more optional comonomers disclosed above; X is from 0 to 50 weight % of the E/X/Y copolymer, Y is from 0 to 35 weight % of the E/X/Y copolymer, wherein the weight % of X and Y cannot both be 0, and E being the remainder.

Examples of ethylene copolymers include, but are not limited to, ethylene/acrylic acid (EAA), ethylene/vinyl acetate (EVA), ethylene/methyl acrylate (EMA), ethylene/ethyl acrylate (EEA), ethylene/butyl acrylate (EBA), ethylene/isobutyl acrylate (EiBA), ethylene/isobutyl acrylate/methacrylic acid, ethylene/methyl acrylate/maleic anhydride, ethylene/butyl acrylate/glycidyl methacrylate (EBAGMA), ethylene/butyl acrylate/carbon monoxide (EBACO), and combinations of two or more thereof.

Examples of commercially available ethylene copolymers include those available from E. I. du Pont de Nemours and Company (DuPont), Wilmington, Del., carrying the trademarks of Surlyn®, Nucrel®, Appeel®, Bynel®, Elvaloy®, and Elvax®.

Such ethylene copolymers can be produced by any means known to one skilled in the art using either autoclave or tubular reactors (e.g., U.S. Pat. Nos. 3,404,134, 5,028,674, 6,500,888 and 6,518,365).

For example, an ethylene copolymer can be produced at high pressure and elevated temperature in a tubular reactor. The inherent consequences of dissimilar reaction kinetics for the respective ethylene and alkyl acrylate (e.g. methyl acrylate) comonomers is alleviated or partially compensated by the intentional introduction of the monomers along the reaction flow path within the tubular reactor. Such tubular reactor-produced ethylene copolymer has a greater relative degree of heterogeneity along the polymer backbone (a more blocky distribution of comonomers), reduced long chain branching, and a higher melting point than one produced at the same comonomer ratio in a high pressure stirred autoclave reactor.

Thermoplastic polymer can be polyvinyl chloride and the composite composition contains at least about 50 weight % of cellulosic material based on the total weight of the composite composition.

A compatibilizing agent can comprise, or be produced from the contacting or reaction of, polyvinyl butyral and a second polymer in which the polyvinyl butyral has at least one hydroxyl functionality and the second polymer reacts with at least a portion of the hydroxyl functionality.

Polyvinyl butyral (PVB) is a thermoplastic material useful for imparting shatter-resistance to glass in such applications as windshields for automobiles and window glass in homes and buildings, for example. The preparation of polyvinyl butyral is known commercially. For example, BUTACITE® is a polyvinyl butyral product manufactured by DuPont. The PVB has at least some hydroxyl functionality to react with the second polymer.

The second polymer can comprise a polymer having one or more functional groups including isocyanates, epoxides, silanes, sulfonic acids, phosphoric acids, anhydrides, carboxylic acids, carboxylic acid esters, or combinations of two or more thereof. Anhydrides, carboxylic acids, carboxylic acid esters, or combinations of two or more thereof are preferred functional groups. The functional equivalent of maleic anhydride can be maleic acid and/or salts thereof, maleic acid diesters, maleic acid monoesters, itaconic acid, fumaric acid, fumaric acid monoesters, or combinations of two or more thereof. The second polymer can be a copolymer of ethylene, carbon monoxide, butyl acrylate, and maleic anhydride. Examples of the second polymer is commercially available from DuPont under the FUSABOND® brand name, which includes polyolefins having anhydride functionality such as maleic anhydride or its equivalent maleic and/or its salts, maleic acid mono- or diesters, itaconic acid, fumaric acid, and fumaric acid monoesters.

The second polymer can be a direct or graft copolymer of ethylene, carbon monoxide, maleic anhydride or its functional equivalent, and a monomer including vinyl acetate, acrylic acid or its esters, methacrylic acid or its esters, or combinations of two or more thereof such as, for example, a copolymer derived from ethylene, carbon monoxide, and butyl acrylate and grafted with maleic anhydride. An example of such a second polymer is FUSABOND® A MG-423D (ethylene/alkyl acrylate/CO copolymer that has been modified with 1% maleic anhydride graft), available from DuPont.

Methods for carrying out the reaction of PVB and the second polymer are disclosed in U.S. Patent Application 2003/0212203. The process can comprise mixing polyvinyl butyral with a second component under conditions wherein a chemical reaction occurs between the unmodified PVB and the second polymer. The conditions can comprise (1) exposing the PVB and second component or mixture to a temperature such that a melt blend (melt) is obtained; (2) cooling the melt to obtain a solid composition of chemically modified PVB; and (3) pelletizing the solid composition. The PVB and second component can be mixed in a ratio of from about 1:100 to about 100:1 (parts per hundred parts), about 5:1 to about 100:1, about 10:1 to about 50:1, or about 10:1 to about 25:1.

The melt blend can be obtained by heating the PVB mixture at a temperature of from about 100° C. to about 260° C., about 120° C. to about 255° C., or about 150° C. to about 250° C.

A compatibilizing agent can be present in an amount of from about 1 to about 20%, 3 to about 10%, or about 4 to about 6 weight % to achieve improvements in the physical, mechanical and thermal characteristics of the materials.

Wishing not to be bound by theory, a compatibilizing agent can reduce the viscosity of the cellulosic composites and thus improve the processibility of the composites when they are formed into shaped articles such as by extrusion or compression molding; or allow the formation of processible composites that contain about 50 weight % or greater of cellulosic material such as in the case of polyvinyl chloride/wood composites, where it can be difficult to achieve wood levels that high and yet retain good processing and formability properties.

The composite compositions of the present invention can include from about 10 to about 90%, about 30 to about 60%, or about 40% to about 55, or 50 weight % of cellulosic material; about 70% to about 10%, about 40 to about 60%, or about 35 to about 50% of the thermoplastic polymer; and about 1% to about 20%, about 3% to about 10%, or about 4% to about 6% of the compatibilizing agent.

The composite composition can be produced by any methods known to one skilled in the art such as combining a cellulose material (e.g., wood, sawdust or wood flour, generally dry) with a thermoplastic polymer, and a compatibilizing agent in an intensity mixer, e.g. a ribbon blender or any low intensity mixer commonly used in blending solids. The mixture can be then processed in a heated extruder at temperatures suitable for processing the particular thermoplastic polymer chosen.

In another method a masterbatch composition can be prepared from about 50 to about 95% or about 75 to about 90 weight % of cellulosic material (e.g., sawdust or wood flour) and from about 5 to about 10%, or about 10 to about 25% of a compatibilizing agent. The resulting masterbatch can be blended with a particular thermoplastic polymer or mixture thermoplastic polymers to obtain composites having the same range of compositions as those prepared by direct blending of the ingredients. The masterbatch method provides a supply that can be prepared, stored and subsequently used to react with any chosen thermoplastic polymer. The masterbatch method can also increase the wetting of the cellulosic with compatibilizing agent thereby providing composites with somewhat enhanced properties. The masterbatch or the composition produced from the masterbatch can be produced batch-wise or continuously.

The compositions can additionally comprise conventional additives used in polymeric materials including plasticizers, stabilizers including viscosity stabilizers and hydrolytic stabilizers, antioxidants, ultraviolet ray absorbers, anti-static agents, dyes, pigments or other coloring agents, inorganic fillers, fire-retardants, lubricants, reinforcing agents such as glass fiber and flakes, foaming or blowing agents, processing aids, antiblock agents, release agents, and/or mixtures thereof. Optional additives, when used, can be present in various quantities so long as they are not used in an amount that detracts from the basic and novel characteristics of the composition.

An inorganic filler can optionally be used that comprises particles of inorganic compounds, such as minerals and salts. The amount of filler that can be added to the composition of the present invention is not critical, but will generally be from 0.001 to about 50%.

Foaming or blowing agents known to one skilled in the art can be incorporated from about 0.001 to 3% to reduce the density of the artificial lumber product, and also to "size" the product to the required dimensions in an extrusion process. Examples of solid blowing agents of the masterbatch mix are combinations of monosodium citrate and sodium bicarbonate, preferably encapsulated in vegetable oil (i.e. a mixture of mono-, di-, and/or tri-glycerides), the amounts of monosodium citrate and sodium bicarbonate present preferably also as a stoichiometric mixture. Examples of commercial solid blowing agents are the SAFOAM P and SAFOAM FP powders (mixture of monosodium citrate and sodium bicarbonate encapsulated in vegetable oil), available from Reedy International Corporation, Keyport, N.J., as disclosed in U.S. Pat. No. 5,817,261. Exothermic blowing agents include azodicarbonamide, 4,4-oxy-bis(benzenesulfonyl hydraziole), p-toluenesulfonyl semicarbazide, phenyl tetrazole, or combinations of two or more thereof. Endothermic blowing agents include inorganic carbonates and bicarbonates including magnesium carbonate, bicarbonate, or combinations thereof.

Heat stabilizers can optionally be used in any amount from about 0.001 to about 10% to prevent degradation of the composite due to heat histories. Suitable heat stabilizers include, for example, a calcium/phosphate derivative of a hindered phenol sold under the trademark RECYCLOSTAB 411 (calcium phosphate) by Ciba-Geigy Chemicals (Tarrytown, N.Y.). The heat stabilizer compound can also be one or more hydroxyamines, phenols, phosphates, and metal soaps. In the case where the thermoplastic polymer of the composite is polyvinyl chloride or polyvinyl chloride copolymer, conventional polyvinyl chloride stabilizers, well known in the art, may also be used.

Suitable optional antioxidants include alkylated phenols and bis-phenols such as hindered phenols, polyphenols, thio and di-thio polyalkylated phenols, lactones such as 3-arylbenzofuran-2-one and hydroxyl-amine as well as Vitamin E.

Reinforcing agents such as glass fiber and flakes can optionally be used to improve flex modulus of the wood composite, allowing it to have greater stiffness and strength suitable for structural applications.

The compositions can be formed into shaped articles using methods such as injection molding, compression molding, overmolding, or extrusion. Optionally, formed articles comprising the composite of the present invention can be further processed. For example, pellets, slugs, rods, ropes, sheets and molded articles of the present invention may be prepared and used for feedstock for subsequent operations, such as thermoforming operations, in which the article is subjected to heat, pressure and/or other mechanical forces to produce shaped articles. Compression molding is an example of further processing.

The compositions can be cut, injection molded, compression molded, overmolded, laminated, extruded, milled or the like to provide the desired shape and size to produce commercially usable products. The resultant product may have an appearance similar to wood and may be sawed, sanded, shaped, turned, fastened and/or finished in the same manner as natural wood. It is resistant to rot and decay as well as termite attack and may be used as a replacement for natural wood, for example, as decorative moldings inside or outside of a house, railroad ties, picture frames, furniture, porch decks, railings, window moldings, window components, door components, roofing systems, sidings, or other types of structural members.

The following examples are presented to merely demonstrate and illustrate of the invention.

EXAMPLES

Ingredients

Wood Flour: HUBER F06 Wood Flour, P. J. Murphy Forestry Products, Montville, N.J.

Polyvinyl Chloride: PVC (K value 55), Shintech Inc., Houston Tex.

Compatibilizing Agent: Reaction product of polyvinyl butyral and FUSABOND® A MG423D, available as ECOCITE H from DuPont.

Compatibilizing Agent Control A: FUSABOND® A MG423D

Compatibilizing Agent Control B: Ethylene, butyl acrylate or vinyl acetate, carbon monoxide copolymer or available as ELVALOY® 741 (copolymer of ethylene, vinyl acetate, carbon monoxide) from DuPont.

Heat Stabilizer: Witco MARK 1178 (tris-nonylphenyl phosphate), available from Crompton Corporation, Middlebury, Conn.

Acid Scavenger: DRAPEX 6.8 Epoxidized Soy Oil, also available from Crompton Corporation.

Example 1

This example illustrates the performance of the compatibilizing agent of the invention in preparing 50:50 PVC:wood composites and in comparison with compatibilizing agent controls A and B.

The compositions tested contained 46.9% wood flour, 46.9% PVC, 2.4% compatibilizing agent or compatibilizing agent control, 1.4% MARK 1178 and 2.3% DRAPEX 6.8, all by weight.

For preparation and blending the stabilizers and modifiers were added to the PVC in a cup and mixed with a spatula just before being added to a roll mill. After the PVC compound was fused, the wood flour was added to the mix. The temperature was 250° F. (121° C.). The sample containing compatibilizing agent B ran for 20 minutes with standard roll mill mixing (cutting the sample and reintroducing to the mill). The other two samples were mixed for 15 minutes.

Plaques of the produced composites were compression molded (6 inch×6 inch×150 mil) at 350° F. (177° C.) for 4 minutes at 28,000 psi ($1.95\times10^5$ kPa), and then test samples (dog bones and flex bars) were cut using a jigsaw.

The tests run on the samples were conducted using ASTM D638 Tensile and Elongation (0.2 in/minute), ASTM D790 Flex Properties, and ASTM E831 Thermo Mechanical Analysis measuring linear thermal expansion between −40 to 23° C. The results are in Table 1.

TABLE 1

| | Compatibilizing Agent | Compatibilizing Agent Control A | Compatibilizing Agent Control B |
|---|---|---|---|
| Tensile Strength (kpsi) | 3.45 | 2.55 | 4.4 |
| Break Elongation (%) | 0.9 | 0.9 | 0.9 |
| Flex Modulus (kpsi) | 546 | 450 | 822 |
| Flex Strength (kpsi) | 5.91 | 5.01 | 6.7 |
| Coefficient of Thermal Linear Expansion (μm/mC.°) | 33.8 | 34.0 | 55.8 |

These results indicate that using compatibilizing agent provided the best balance of tensile strength and flex modulus and the lowest coefficient of thermal expansion.

Example 2

This example was carried out using a commercially available blend of wood flour and PVC containing greater than 50 weight % of wood flour. The same compatibilizing agent and control compatibilizing agents were evaluated at the 5 weight % level. Also tested was a composition containing no added compatibilizing agent. No other additives were used. It is believed that the PVC/wood blends contained proprietary stabilizers and additives.

Samples (60 g) of the PVC/wood blend along with 3 g of the appropriate compatibilizing agent or compatibilizing agent control were mixed in a cup, and then added to the small 60 cc test bowl of a BRABENDER PLASICORDER 2100 with a roller blades. The mixer temperature was set at 170° C. with a speed of 60 rpm. Total time was about 5 to 7 minutes for each sample.

For physical property testing plaques were compression molded (6 inch×6 inch×40 mil) at 350° F. (177° C.) for 4 minutes at 28,000 psi. Test samples were prepared and test carried out as described in Example 1. The results are in Table 2.

TABLE 2

| | Comp. Agent | Comp. Agent Control A | Comp. Agent Control B | No Comp. Agent |
|---|---|---|---|---|
| Tensile Modulus 100% (kpsi) | 704 | 591 | 735 | 696 |
| Tensile Strength (kpsi) | 2.2 | 4.04 | 4.95 | 4.13 |
| Break Elongation (%) | 0.3 | 1 | 0.9 | 0.7 |
| Flex Modulus (kpsi) | 727 | 464 | 481 | 615 |
| Flex Strength (kpsi) | 6.5 | 6.8 | 6.9 | 7.7 |
| Coefficient of Thermal Linear Expansion (μm/mF.°) | 15.5 | 24.1 | 29.6 | 19.7 |

These data demonstrate that the compatibilizing agents provided a higher flex modulus and lower coefficient of linear expansion, both desirable characteristics for commercial applications, than did the control modifiers or the composite without added compatibilizing agent.

Example 3

This example demonstrates the use of masterbatches of wood flour and compatibilizing agent to prepare the PVC/wood composites of the invention.

Masterbatches of wood flour and compatibilizing agent were prepared as follows. Compatibilizing agent was banded on a roll mill at 250° C. Then wood flour was added until it would not continue to band. Observation and physical properties of the blends of wood flour and compatibilizing agent showed that the compatibilizing agent was able to carry at least 90% wood flour. In this way three masterbatches containing 25% of (A), 17% of (B) and 10% of (C) compatibilizing agent were prepared. A control, essentially matching in composition the composite prepared with Masterbatch A, in which the PVC and wood flour were added separately was also prepared by the method described in Example 1.

For preparation of the PVC/wood flour composites, the wood flour masterbatches prepared as described above were blended with PVC at such a level that the wood was 50% of the final composite and the PVC was at a level as indicated in Table 3 below. The samples also contained MARK 1178 and DRAPEX 6.8 at the levels indicated in the table. The PVC and the wood flour masterbatches were combined using a BRABENDER Prep mixer (300 cc bowl) with roller blades, run at 180° C. and 60 rpm. The PVC was added to the mixer and then the masterbatch was added. The mix was run for a maximum of 7 minutes (through fusion to steady state temperatures).

Plaques (6 inch×6 inch×40 mil) were compression molded at 350° F. for 4 minutes under 28,000 psi. Test samples were prepared and test carried out as described in Example 1. The results are in Table 3.

screw feeders (K-Tron) and fed to a 30 mm Werner & Pfleiderer corotating twin-screw extruder. The extruder consisted of nine barrels. The feed port was in the first barrel and no die was used.

As the masterbatch exited the extruder, it dropped as a crumb onto a conveyor belt where it cooled before packaging. The temperature profile on the barrels, the melt temperature, the screw speed and the extrusion rate may be found in Table 4 along with the masterbatch compositions.

TABLE 4

| | Barrel Temperature (° C.) | | | |
| --- | --- | --- | --- | --- |
| | Sample | | | |
| | A | B | C | D |
| 1 | — | — | — | — |
| 2 | 52 | 41 | 100 | 99 |
| 3 | 101 | 100 | 112 | 109 |
| 4 | 148 | 131 | 177 | 151 |
| 5 | 152 | 120 | 160 | 145 |
| 6 | 146 | 124 | 144 | 136 |
| 7 | 149 | 123 | 129 | 126 |
| 8 | 100 | 123 | 123 | 122 |
| 9 | 50 | 119 | 114 | 111 |
| Melt | — | 181 | 205 | 180 |
| Screw speed (rpm) | 200 | 200 | 205 | 205 |
| Rate (pph) | 12 | 17 | 22 | 21 |
| Wood* (%) | 83.3 | 88.2 | 90.9 | 95.2 |
| Water (5) | 1.3 | 1.3 | 1.6 | 1.6 |

*Initially contained 5% water

The invention claimed is:

1. A composition comprising, or produced from, by weight (a) about 10 to about 90% of cellulosic material, (b) about 70 to about 10% of a thermoplastic polymer, and (c) about 1 to about 20% of a compatibilizing agent which comprises or is produced from polyvinyl butyral and a second polymer

TABLE 3

| | Control, No Masterbatch | Masterbatch A | Masterbatch B | Masterbatch C |
| --- | --- | --- | --- | --- |
| Wood (%) | 50 | 50 | 50 | 50 |
| PVC (%) | 29 | 28.7 | 34.2 | 32.5 |
| Compatibilizing Agent (%) | 16.6 | 16.6 | 10 | 5.6 |
| MARK 1178 (%) | 1.7 | 1.7 | 2.1 | 2.0 |
| DRAPEX 6.8 (%) | 2.9 | 2.9 | 3.4 | 3.3 |
| Tensile Modulus (kpsi) | 507 | 613 | 934 | 1029 |
| Tensile Strength (kpsi) | 1.66 | 2.26 | 2.7 | 2.36 |
| Flex Modulus (kpsi) | 367 | 321 | 541 | 505 |
| Flex Strength (kpsi) | 3.9 | 4.0 | 4.5 | 4.7 |
| Coefficient of Thermal Linear Expansion (μm/mC.°) | 48.2 | 33.5 | 38.0 | 38.0 |

The data demonstrate that the masterbatch procedure produced composites with satisfactory properties. Comparison of the control composite (no masterbatch) with the composites made using masterbatches A, B or C indicates that masterbatching provided higher tensile strengths and lower coefficients of thermal linear expansion than did separate addition.

Example 4

Wood flour (Oak #4033) and the Ecocite® pellets were metered separately using loss in weight gravimeteric single wherein the polyvinyl butyral comprises a hydroxyl functionality and the second polymer reacts with at least a portion of the hydroxyl functionality.

2. The composition of claim 1 wherein the second polymer comprises a polymer having one or more functional groups including isocyanate, epoxide, silane, sulfonic acid, phosphoric acid, anhydride, carboxylic acid, carboxylic acid ester, or combinations of two or more thereof.

3. The composition of claim 1 wherein the second polymer comprises a direct or graft copolymer of ethylene, carbon monoxide, maleic anhydride or its functional equivalent, and monomer including vinyl acetate, acrylic acid or its ester, methacrylic acid or its ester, combinations of two or more thereof.

4. The composition of claim 2 wherein the second polymer comprises a direct or graft copolymer of ethylene, carbon monoxide, maleic anhydride or its functional equivalent, and monomer including vinyl acetate, acrylic acid or its ester, methacrylic acid or its ester, combinations of two or more thereof; and the functional equivalent is maleic acid and/or a salt thereof, maleic acid diester, maleic acid monoester, itaconic acid, fumaric acid, fumaric acid monoester, or combinations of two or more thereof.

5. The composition of claim 2 wherein the cellulosic material is wood and the second polymer comprises a polymer having one or more functional groups including anhydride, carboxylic acid, carboxylic acid ester, or combinations of two or more thereof.

6. The composition of claim 3 wherein the cellulosic material is wood; the direct or graft copolymer is a copolymer of ethylene, carbon monoxide, butyl acrylate and maleic anhydride; and the functional equivalent is maleic acid and/or a salt thereof, maleic acid diester, maleic acid monoester, itaconic acid, fumaric acid, fumaric acid monoester, or combinations of two or more thereof.

7. The composition of claim 2 wherein the thermoplastic polymer comprises (1) at least one polyethylene, ethylene/α-olefin copolymers, ethylene/propylene/diene monomer terpolymers, polypropylene homopolymers, polypropylene copolymers, polyvinyl chloride, polyvinyl chloride copolymers, chlorinated polyvinyl chloride, polystyrene, or combinations of two or more thereof; or (2) at least one polymer or copolymer including polymer and/or copolymer of methyl methacrylate and ethylene copolymer; the ethylene copolymer includes ethylene/acrylate copolymer, ethylene/vinyl acetate copolymer, ethylene/acrylate/carbon monoxide copolymer, ethylene/vinyl acetate/carbon monoxide copolymer, ethylene/acrylic acid copolymer, ethylene/methacrylic acid copolymer, salts derivable from ethylene/methacrylic and/or acrylic acid copolymer, ethylene/acrylic ester copolymer, ethylene/methacrylic ester copolymer, or combinations of two or more thereof.

8. The composition of claim 4 wherein the thermoplastic polymer comprises (1) at least one polyethylene, ethylene/α-olefin copolymers, ethylene/propylene/diene monomer terpolymers, polypropylene homopolymers, polypropylene copolymers, polyvinyl chloride, polyvinyl chloride copolymers, chlorinated polyvinyl chloride, polystyrene, or combinations of two or more thereof; or (2) at least one polymer or copolymer including polymer and/or copolymer of methyl methacrylate and ethylene copolymer; the ethylene copolymer includes ethylene/acrylate copolymer, ethylene/vinyl acetate copolymer, ethylene/acrylate/carbon monoxide copolymer, ethylene/vinyl acetate/carbon monoxide copolymer, ethylene/acrylic acid copolymer, ethylene/methacrylic acid copolymer, salts derivable from ethylene/methacrylic and/or acrylic acid copolymer, ethylene/acrylic ester copolymer, ethylene/methacrylic ester copolymer, or combinations of two or more thereof.

9. The composition of claim 7 wherein the thermoplastic polymer comprises polyvinyl chloride.

10. The composition of claim 8 wherein the thermoplastic polymer comprises polyvinyl chloride.

11. The composition of claim 9 wherein the cellulosic material is wood.

12. The composition of claim 10 wherein the cellulosic material is wood.

13. The composition of claim 11 comprising at least about 50 weight % of the cellulosic material.

14. The composition of claim 12 comprising at least about 50 weight % of the cellulosic material.

15. An article comprising or produced from a composition wherein the article is a decorative molding, picture frame, furniture, porch deck, railing, window molding, window component, door component, roofing system, railroad tie, siding or other structural member and the composition is as recited in any of claim 1, claim 7, claim 8, or claim 14.

16. A masterbatch comprising from about 50 to about 95 weight % of cellulosic material based on the total weight of the masterbatch composition and from about 5 to about 50 weight % of a compatibilizing agent which is as recited in claim 1 and the masterbatch optionally further comprises a thermoplastic polymer as recited in claim 1 or claim 7.

17. A process comprising blending a masterbatch composition with a thermoplastic polymer to produce a composition comprising from about 10% to about 90%, or about 50%, of cellulosic and from about 70% to about 10% of the thermoplastic polymer, based on the total weight of the composition wherein the masterbatch composition is as recited in claim 16; and the thermoplastic polymer is optionally polyvinyl chloride.

* * * * *